(12) United States Patent
Eastman et al.

(10) Patent No.: US 9,803,626 B1
(45) Date of Patent: Oct. 31, 2017

(54) THERMOSIPHONING SUPERCRITICAL CO2 IN GEOTHERMAL ENERGY PRODUCTION

(71) Applicant: GreenFire Energy, Inc., Salt Lake City, UT (US)

(72) Inventors: Alan D. Eastman, Salt Lake City, UT (US); Mark P. Muir, Venice, CA (US); John R. Muir, Lafayette, CA (US)

(73) Assignee: GREENFIRE ENERGY INC., Salt Lake City, UT (US)

( * ) Notice: Subject to any disclaimer, the term of this patent is extended or adjusted under 35 U.S.C. 154(b) by 82 days.

(21) Appl. No.: 14/707,863

(22) Filed: May 8, 2015

Related U.S. Application Data

(60) Provisional application No. 61/990,552, filed on May 8, 2014.

(51) Int. Cl.
*F03G 7/04* (2006.01)
*F24J 3/08* (2006.01)
*F01K 11/02* (2006.01)

(52) U.S. Cl.
CPC ...... *F03G 7/04* (2013.01); *F24J 3/08* (2013.01); *F24J 3/085* (2013.01); *F01K 11/02* (2013.01); *Y02E 10/10* (2013.01); *Y02E 10/14* (2013.01)

(58) Field of Classification Search
CPC ..... F03G 7/04; F24J 3/085; F24J 3/08–3/086; Y02E 10/10–10/14
See application file for complete search history.

(56) References Cited

U.S. PATENT DOCUMENTS

| | | | | |
|---|---|---|---|---|
| 5,515,679 | A * | 5/1996 | Shulman | F03G 7/04 165/104.22 |
| 6,668,554 | B1 * | 12/2003 | Brown | E21B 41/0064 60/641.2 |
| 8,201,409 | B1 | 6/2012 | Zakiewicz | |
| 9,121,393 | B2 * | 9/2015 | Schwarck | F03G 7/04 |
| 2011/0048005 | A1 | 3/2011 | McHargue | |
| 2011/0100002 | A1 * | 5/2011 | Muir | F03G 7/04 60/641.2 |
| 2012/0001429 | A1 * | 1/2012 | Saar | F01K 25/103 290/52 |

OTHER PUBLICATIONS

Brown, Donald W., A Hot Dry Rock Geothermal Energy Concept Utilizing Supercritical CO2 Instead of Water, *Proceedings, Twenty-fifth Workshop on Geothermal Reservoir Engineering*, Stanford University, Stanford, California, Jan. 24-26, 2000, SGP-TR-165, 6 pages.

* cited by examiner

*Primary Examiner* — Mark Laurenzi
*Assistant Examiner* — Xiaoting Hu
(74) *Attorney, Agent, or Firm* — Workman Nydegger

(57) ABSTRACT

Methods for thermalsiphoning supercritical $CO_2$ within a geothermal formation includes providing a geothermal energy system that includes an underground hot rock reservoir, a production well, and an injection well that together form a fluid path suitable for circulating supercritical $CO_2$. The supercritical $CO_2$ flows by thermosiphoning. Thermosiphoning is maximized by maintaining a pressure between 1400-4000 psia, an injection temperature in a range from 50-200 C and a production temperature in a range from 150-600 where injection temperature and the production temperature differ by at least 50° C.

22 Claims, 3 Drawing Sheets

THERMOSIPHONING SUPERCRITICAL CO2 IN GEOTHERMAL ENERGY PRODUCTION

CROSS-REFERENCE TO RELATED APPLICATIONS

This application claims priority to and the benefit of U.S. Provisional Patent Application No. 61/990,552, filed May 8, 2014, the entire contents of which is incorporated by reference herein.

BACKGROUND OF THE INVENTION

1. The Field of the Invention

The present invention relates to a method of thermosiphoning supercritical $CO_2$ in a geothermal energy production system.

2. Background of the Invention

Geothermal energy systems are designed to extract heat from an underground hot rock reservoir. To create a geothermal energy system, a fluid is pumped down into a rock formation through an injection well. This pumping will cause the rock formation to fracture and seal, forming a reservoir. After the reservoir is created, the same fluid or a different working fluid is then pumped into the reservoir and flows across the fractured surfaces of the hot rock reservoir where it is heated by the natural geothermal temperatures within the reservoir. This geothermal heat is transferred to the surface by flowing the working fluid upward through one or more production wells. At the surface, the heated working fluid is used to generate electrical power and then is pumped back into the reservoir via the injection well. This flow is typically carried out in a pressurized, closed-loop circulating operation and requires the use of pumps.

In the industry today, geothermal energy systems mostly use water as the working fluid. However, supercritical carbon dioxide, halogenated hydrocarbon refrigerants, ammonia, mixtures of ammonia and water, or low molecular weight hydrocarbons such as propanes, butanes, and hexanes, and mixtures of these have been theorized to work in geothermal systems as well.

Using supercritical $CO_2$ within a geothermal energy system can be advantageous because supercritical $CO_2$ is generally inert, nonhazardous, provides lower mineral solubility, reduces corrosion, and has faster diffusion rates as compared to water.

The present invention relates to methods for using supercritical $CO_2$ within a geothermal energy system without the use of pumps. The present invention relates to a fluid drive for thermal siphoning supercritical $CO_2$ within the geothermal system and reduces required pumping power.

BRIEF SUMMARY

The present disclosure relates to a method for thermosiphoning supercritical $CO_2$ within a geothermal formation to minimize or eliminate the need for pumping the supercritical $CO_2$. This method includes the use of a geothermal energy system that includes an underground hot reservoir, a production well, and an injection well that together form a fluid path suitable for circulating supercritical $CO_2$. The supercritical $CO_2$ flows freely across the fractured surfaces or within a closed tube through the hot reservoir where it is heated by the natural geothermal temperatures within the reservoir. As supercritical $CO_2$ is heated within a hot reservoir the supercritical $CO_2$ becomes less dense. The buoyancy of the supercritical $CO_2$ causes the supercritical $CO_2$ to rise up through the production well. This rise of supercritical $CO_2$ in the production well has a siphoning effect on supercritical $CO_2$ in the reservoir and injection well, thereby pulling supercritical $CO_2$ within the fluid path. Thermosiphoning is maximized by maintaining a pressure between 1400-4000 psia, an injection temperature in a range from 50-200° C. and a production temperature in a range from 150-600° C. where injection temperature and the production temperature differ by at least 50° C.

At the surface, the heat from the supercritical $CO_2$ is used to generate electrical power. As the supercritical $CO_2$ flows through the energy production cycle the work performed cools the supercritical $CO_2$. The work can be performed directly using the supercritical $CO_2$ or through a secondary working fluid. The thermosiphoning method is carried out in a pressurized, closed-loop circulating operation so that the temperatures and pressures are maintained and controlled. For example, the work performed is limited so as to maintain the $CO_2$ in a supercritical state and to control the temperature and pressure drop between the production well and the injection well. Typically a valve is used to control the flow of supercritical $CO_2$, which maintains proper pressure and temperature in the production well.

It has been discovered that the temperature and pressure ranges described above will create continual thermosiphoning effects in a geothermal system with minimized need for pumping. The desired ranges were discovered by calculating and plotting pressure and a density ratio of the supercritical $CO_2$ at various high and low temperatures.

Unlike most fluids, the density of supercritical $CO_2$ at different temperatures and pressures is not intuitive. Supercritical fluids like supercritical $CO_2$ has properties of those of both liquids and gasses; these differences produce results that differ substantially compared to a traditional working fluid like water. It is surprising and unexpected that when the density ratios for high and low temperatures at a given pressure are plotted on a graph, the graph shows a clear range of pressures that create the highest density ratio for supercritical $CO_2$. Surprisingly, higher temperature differences or higher pressures do not by themselves yield the best results.

FIG. 1 illustrates these unexpected results. FIG. 1 is a graph showing pressures of supercritical $CO_2$ as a function of the density ratio of supercritical $CO_2$ at three different temperature spreads. A first curve $T_1$ shows that a temperature difference of 75° C. from 275° C. to 350° C. produces no appreciable optimum (bottom curve), but the same temperature difference (75° C.) from 75° C. to 150° C. does produce an optimum near 2400 psia as shown by curve $T_2$. Also surprising is that the optimum is in a narrow band of pressure between about 1400 and about 4000 psia. The optimum pressure shifts only slightly when the temperature spread is 275° C. from 75° C. to 350° C. (curve $T_3$). Outside this pressure range the curve flattens out and the increases in pressure are not met with a correspondingly beneficial increase in density ratio. By selecting the temperature and pressures at the induction well and production well to be within the foregoing ranges, thermosiphoning can be maximized at reasonable temperatures and pressures.

The thermosiphoning effect can greatly reduce the required pumping of supercritical $CO_2$ within the geothermal system and optimize the efficiency of the geothermal energy system.

These methods and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawing. It is appreciated that this drawing depicts only illustrated embodiments of the invention and is therefore not to be considered limiting of its scope. The invention will be described and explained with additional specificity and detail through the use of the accompanying drawing in which.

DETAILED DESCRIPTION

Figure 2:
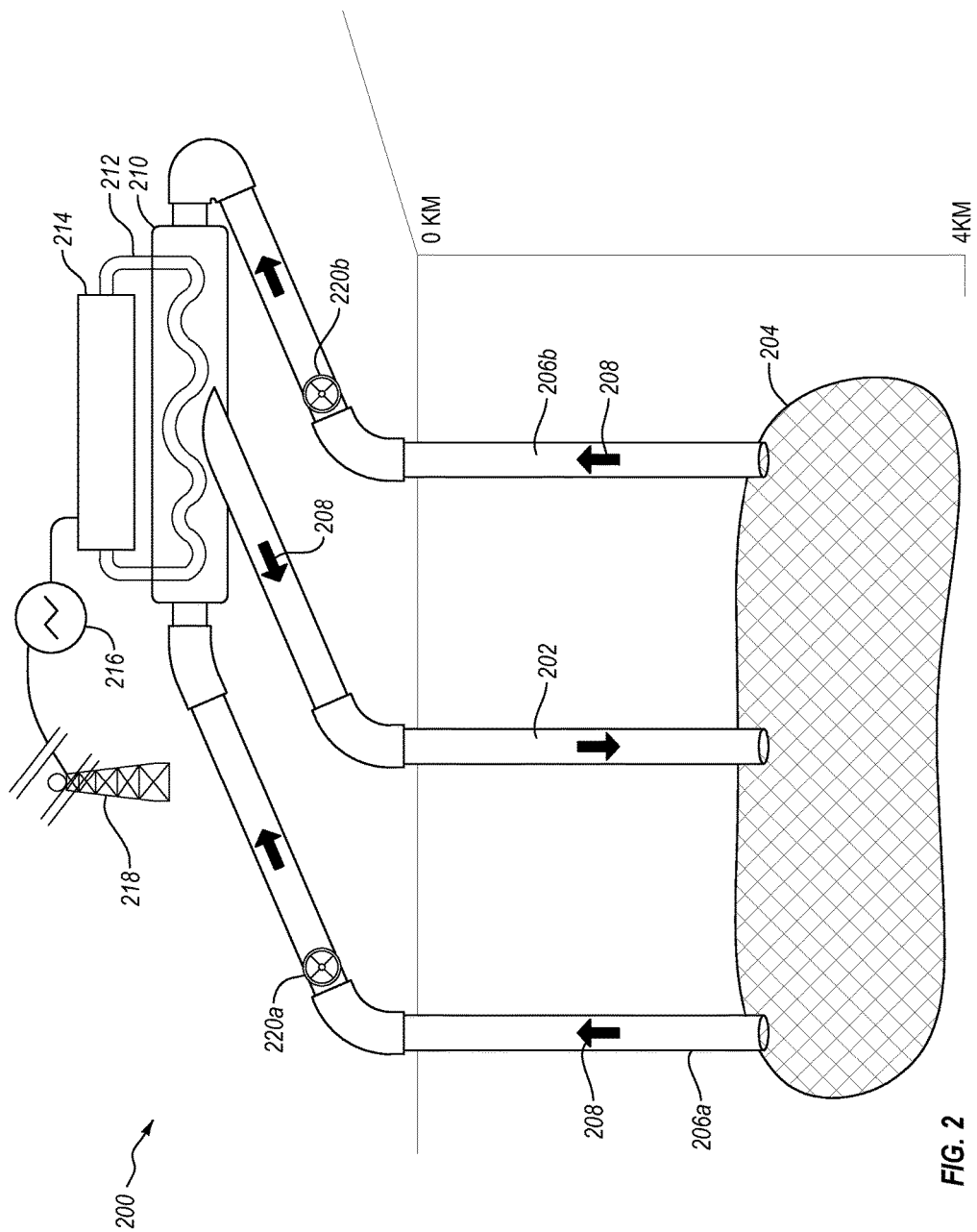
FIG. 2 shows a schematic of a geothermal energy system that produces energy by using thermosiphoning of supercritical $CO_2$ with the use of a heat exchanger, a secondary fluid, and a turbine.

I. Systems for Thermosiphoning Supercritical $CO_2$ within a Geothermal Energy System The present disclosure relates to geothermal energy systems that use supercritical $CO_2$ as the working fluid and create flow using thermosiphoning. Geothermal system suitable for use in the present invention typically include an injection well, an underground hot reservoir, one or more production wells, and an energy producing system that together form a closed loop fluid path suitable for circulating supercritical $CO_2$ FIG. 2 is a schematic illustration of a geothermal system 200 incorporating thermosiphoning methods according to one embodiment of the present invention. As shown in FIG. 2, a geothermal system 200, includes an injection well 202, an underground hot rock reservoir 204, production wells 206 (e.g., 206a and 206b), and a heat exchanger 210, that together form a closed loop fluid path 208 for supercritical $CO_2$.

An injection well 202 is created by drilling a well into a selected underground hot rock formation. Any suitable drilling technique can be used for creating the injection well. Depths are selected to reach a level where there is sufficient heat in the rock to make successful, cost effective thermal production practical. The underground hot rock temperatures that are most effective for geothermal energy systems ranges from, but not limited to, 150° C. to 500° C. The drilling depths are generally in the range from 1,000 ft to about 30,000 ft.

A deep region of igneous, metamorphic rock, or a deep region of limestone or other sedimentary rock can be selected for drilling. All rocks vary in the amount of porosity and permeability they exhibit. Rock porosity or void fraction is a measure of the void space in a rock per unit of volume of the rock. Rock permeability or connected porosity is measured through the volume of gas or liquid that can flow into or through the rock. If high pressure is required to squeeze fluid through a rock, then the rock is said to have low permeability. If a fluid passes through the rock easily, it has high permeability. It is important to note, that fluids or gas cannot pass through unconnected pores, which is why permeability is the more important factor when selecting the underground rock formation. The types of rocks, whether the initial formation or the formation after hydroshearing or hydrofracturing, suited for geothermal energy production using supercritical $CO_2$ may have permeability in a range greater than 0.1, 0.5, 1, 10, or 100 millidarcy and/or less than 1000, 500, 200, or 100 millidarcies, or within a range of any of the foregoing upper and lower permeabilities.

The higher the permeability in the rock formation the easier the supercritical $CO_2$ will flow but the more supercritical $CO_2$ that can be lost in a geothermal energy system. The cost of supercritical $CO_2$ can vary. If the cost of supercritical $CO_2$ is high, it would be optimal to select a rock formation with lower permeability. The lower the rock formations permeability the more drilling and fracturing must be done to create the underground rock reservoir used in the geothermal energy system. This variability is considered when determining which type of rock to drill when creating an underground rock reservoir.

An underground hot rock reservoir 204 is an area of fractured and sealed rock below the injection well 202. Pressured supercritical $CO_2$ is pumped from the surface into an injection well 202 by using convenient means such as with a positive displacement or centrifugal pump. The supercritical $CO_2$ is injected into a packed-off interval of an open hole wellbore using any suitable means such as a high-pressure tubing string. Flowing supercritical CO2 into an area of underground rock through the injection well 202 creates underground hot rock reservoirs 204. Generally, flow rates of supercritical $CO_2$ are in the range from about 20 to about 60 kg/s, depending upon the supercritical $CO_2$ injection pressure in the packed-off well-bore.

During the creation of the fluid path in hot rock, the hot rock is typically fractured. The pressure during fracturing is typically higher than during operation, but can range from 1,100 psi to about 10,000 psia. In a region where the natural fractures in the rock are predominantly vertical, lower pumping pressure is generally necessary than if the preexisting fractures or joints in the rock are predominantly inclined from the vertical. As pumping continues, the natural fractures or joints progressively open and interconnect, forming a multiply connected region of pressure-dilated joints in the rock mass surrounding the packed-off wellbore interval, thus creating the fractured hot rock reservoir region 204. The fracture volume of the reservoir can be as much as ten times or more greater than the original micro crack pore volume of the unfractured rock formation.

Injection periods from a few hours to several months may be required for creating the reservoir region 204, depending upon the characteristics of the in situ stress field, the extent and orientation of fractures and joints already existing in the rock mass to be fractured, the resistance to flow in the network of interconnected fractures, the orientation of join sets in the region to be fractured, and most importantly, upon the desired size of the confined reservoir to be created. Generally an injection period in the range from about a week to about three months is adequate.

After the desired volume of rock is fractured, the pressure of supercritical $CO_2$ being injected is reduced to a pressure at which the system is stabilized with no further fracture extension and no more rock is being fractured at the periphery of the reservoir and, therefore, the reservoir is no longer being enlarged.

One or more production wells 206a and 206b (hereinafter production wells 206) are drilled into the fractured zone using any suitable drilling method. Since the deep earth stress field is normally anisotropic, the pressure-stimulated reservoir region will tend to be elongated in some direction, but still symmetrical about the injection well that was used to create the fractured region that is the reservoir. Therefore, in almost all cases it will be preferred to access the reservoir with a plurality of production wells. Generally, two production wells drilled to penetrate the reservoir near either end of the elongated region are preferred.

While hot dry rock formations often need fracturing to yield a suitable reservoir, in some embodiments, a hot fluid filled reservoir (e.g., hot water) can be used by creating a conduit for the supercritical CO2 between the injection well and the production well. If needed, a bore to accommodate a tubing can be drilled using horizontal drilling techniques. Tubing in fluid communication with the injection well and production well carries the supercritical $CO_2$ through the hot reservoir, thereby creating a fluid path for the supercritical $CO_2$. The tubing allows the supercritical $CO_2$ to exchange heat without allowing mixing between the supercritical $CO_2$ and the reservoir fluids. Using tubing through a fluid filled reservoir prevents $CO_2$ from escaping from the system and takes advantage of the convection of fluids in the reservoir. A closed tubing within the reservoir can be used with any of the embodiments of the invention described herein where it is desirable to isolate the supercritical $CO_2$ from the natural surfaces of the reservoir.

As shown in FIG. 2, allowing the supercritical $CO_2$ to flow through the parts of the system creates a closed loop fluid path 208 for supercritical $CO_2$. FIG. 2 shows a valve 220a and 220b placed in the closed loop system after the production well. Valve 220a and 220b allows control of the fluid flow. Sufficient supercritical $CO_2$ is flowed through the injection well 202 to continue filling reservoir 204. The supercritical $CO_2$ is heated by the transfer of energy from the hot rock surfaces it comes into contact within the reservoir 204. As the supercritical $CO_2$ is heated it expands to some extent, losing density. The heated supercritical $CO_2$ will raise and flow upward through the production wells 206 to the surface, where it will flow through a selected energy production system.

Energy production systems consist of equipment and parts that are suitable to extract heat from supercritical CO2 and convert the heat into electricity. Energy production systems are placed after the production wells 206. As shown in FIG. 2, a heat exchanger 210 is used to extract heat from the supercritical $CO_2$ by heating a secondary working fluid 212. Supercritical $CO_2$ is caused to flow through the heat exchanger 210 and warm a secondary working fluid 212. Typically the supercritical $CO_2$ fluid is flowed in a counter flow with the secondary fluid 212 such that secondary working fluid exiting the heat exchanger 210 is in contact with newly introduced (and therefore the hottest) carbon dioxide fluid. Conversely, the input of the secondary fluid (which is typically the coldest fluid) first contact the carbon dioxide fluid near the outlet of the carbon dioxide fluid.

The secondary working fluids 212 can be any fluid suitable for use in the heat exchanger and that can be used to perform work when heated. Examples of secondary working fluids that can be used in the binary process of the present invention include, but are not limited to, pentane, isobutane, a halogenated hydrocarbon refrigerant, liquid ammonia or another suitable Rankine-cycle working fluid.

The secondary fluid 212 may be used to generate electrical power in a turbine 214. The secondary working fluid 212 may be vaporized and the expanding vapor used to spin the turbine 214 while losing pressure and temperature. The expanded gaseous secondary fluid 212 may then be circulated through a cooling tower where it is condensed to the liquid phase. The liquid phase secondary working fluid may then be pumped back into the heat exchanger 210 where it is once again heated and then vaporized to continuously drive the turbine 214. The power generated from the turbine 214 may be used on site or transferred to a power plant 216. The electricity can then be injected into an electrical grid 218 for commercial use.

Figure 3:
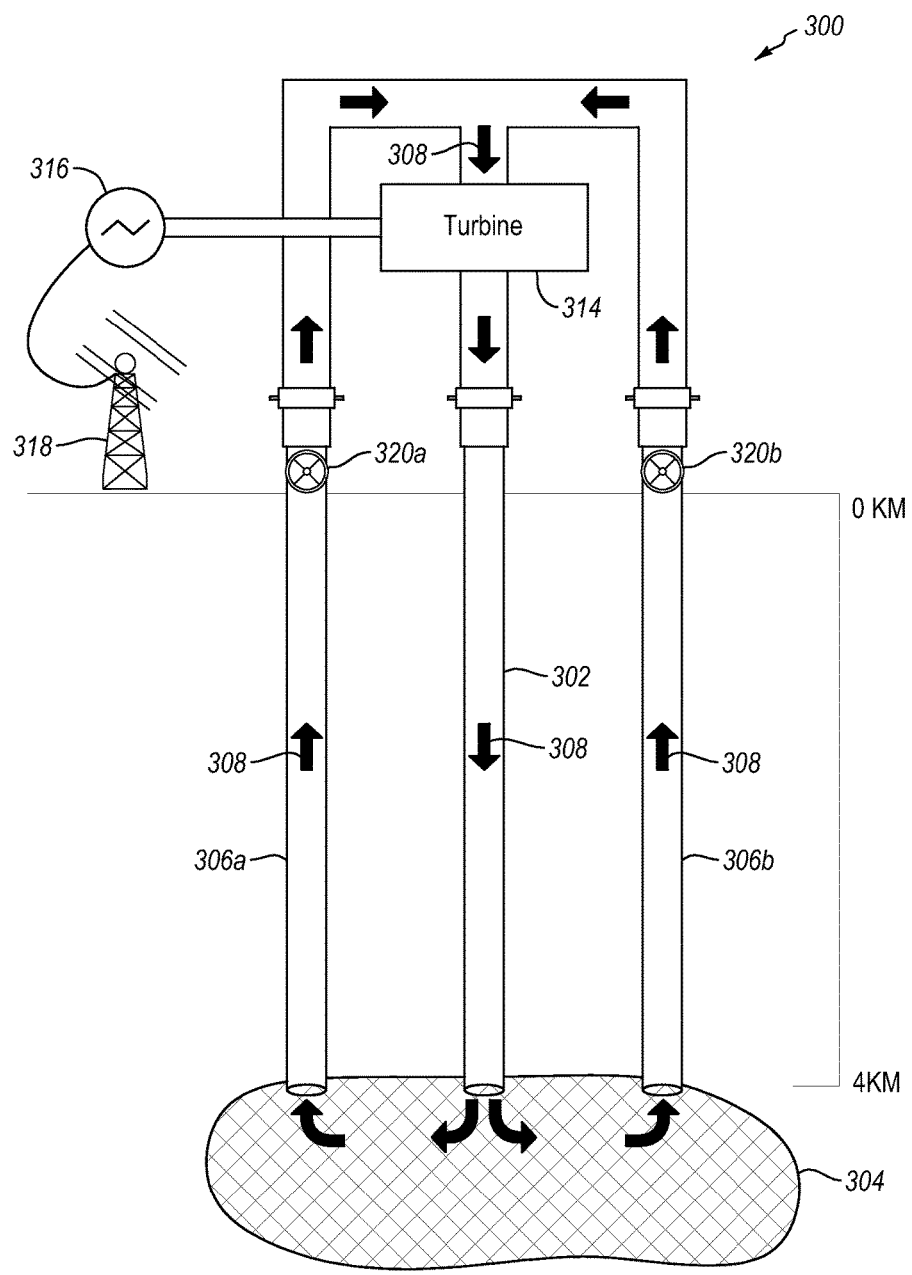
FIG. 3 shows a schematic of a geothermal energy system that produces energy by using thermosiphoning of supercritical $CO_2$ with the use of a supercritical $CO_2$ turbine.

FIG. 3 is a schematic illustration of an alternative geothermal energy system suitable for implementing the thermosiphoning methods of the invention. FIG. 3 illustrates a system in which the supercritical $CO_2$ is used to directly drive a turbine. As shown in FIG. 3 a geothermal system 300 includes an injection well 302, an underground hot rock reservoir 304, production wells 306 (e.g., wells 306a and 306b), valve 320 (e.g. 320a and 320b), and a power-generating turbine 314 that together form a closed loop fluid path 308 suitable for circulating supercritical $CO_2$.

In FIG. 3, the energy production system circulates supercritical $CO_2$ from the production wells 306 directly into a power-generating turbine 314 compatible with a supercritical $CO_2$ working fluid. In the power-generating turbine 314, the heat from the supercritical $CO_2$ is used to drive the turbine 314. The supercritical $CO_2$ expands isentropically to a lower temperature and pressure. The supercritical $CO_2$ remains at a supercritical state and is never cooled low enough to not remain in a supercritical state. This method eliminates the need for primary heat exchangers 210 because the supercritical $CO_2$ is expanded directly in the power-generating turbine 314. Turbines that run off supercritical $CO_2$ are significantly more efficient than conventional turbines. Supercritical $CO_2$ turbines may also be smaller than conventional turbines of similar power rating because of the higher efficiency. Supercritical $CO_2$ turbines can have 2-5 times increase in power output in the same footprint. These reasons make it possible and desirable to use a supercritical $CO_2$ powered turbine as part of the closed-loop system in the geothermal system.

The power generated from the turbine 314 may be used on site or transferred to a power plant 316. The electricity can then be delivered to an electrical grid 318 for commercial use. In addition to surface electric power generating plants, the geothermal heat may be used for applications such as, but not limited to, space heating, preheating materials for chemical processes, drying pumice or other minerals that are unearthed with excess moisture, heating greenhouses, drying crops, heating water, or any other direct-heat application requiring a moderate-temperature hot fluid.

II. Methods for Thermosiphoning Supercritical $CO_2$ within a Geothermal Energy System The foregoing systems may be used in methods to produce thermosiphoning. To create thermosiphoning, the geothermally heated supercritical $CO_2$ flows from the hot rock reservoir through the production well. The geothermally heated supercritical $CO_2$ is introduced into an energy production system where heat is extracted. The cooler supercritical CO2 entering the injection well and hot rock reservoir is denser than the hotter supercritical CO2 leaving the hot rock reservoir, thereby creating a siphoning effect. The temperature in the hot rock reservoir, pressure throughout the system, well depths, fluid path size, heat exchange parameters, and other similar factors contribute to how much of a siphoning effect exists in the system and therefore the rate of flow, heat transfer, pumping requirements and overall efficiency of the system.

Figure 1:
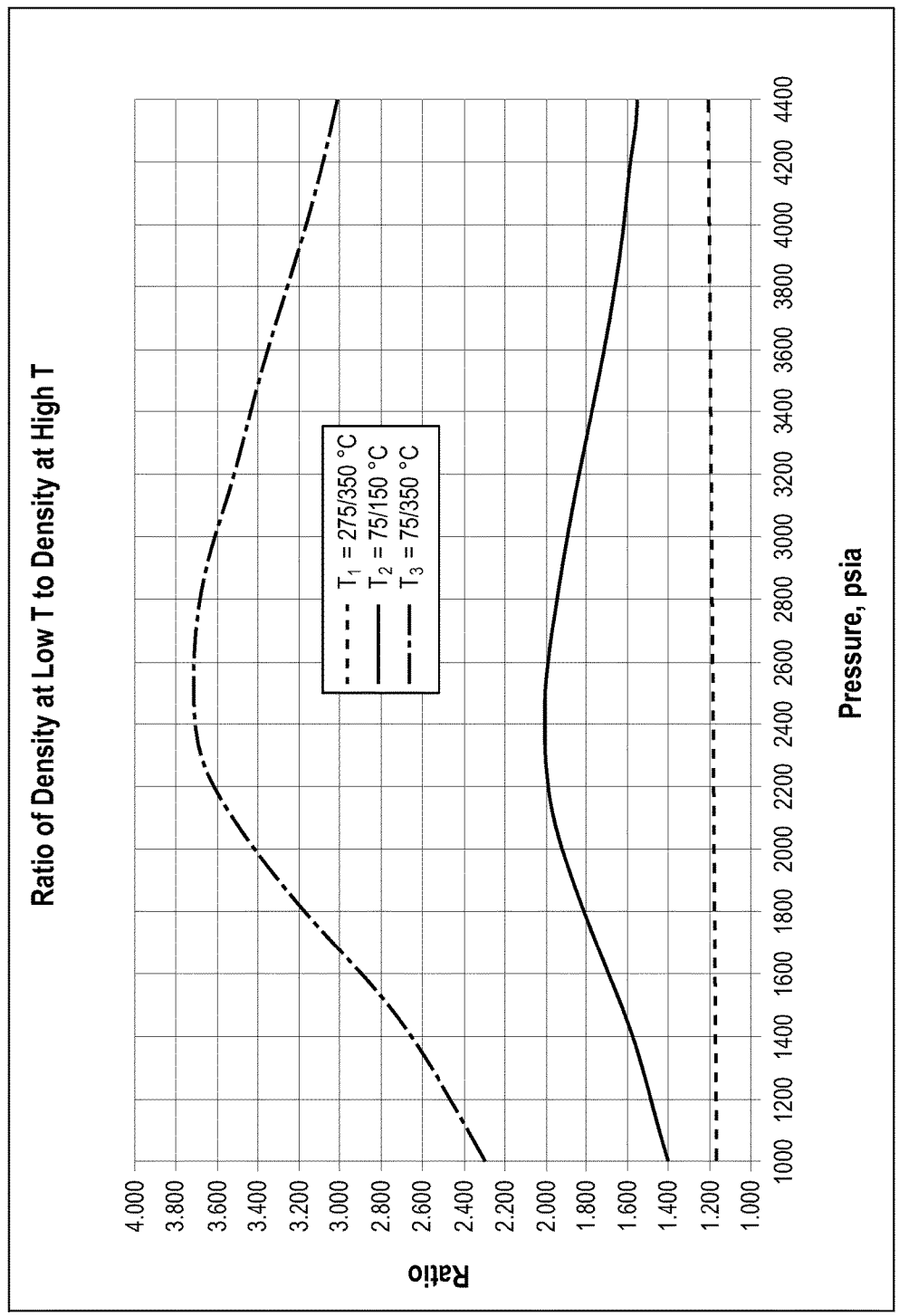
FIG. 1 is a graph showing pressures of supercritical $CO_2$ as a function of the density ratio of supercritical $CO_2$ at low temperatures to density at high temperatures.

It has been discovered that the temperature and pressure ranges necessary to create thermosiphoning in a geothermal system are best selected from observing a density ratio curve for supercritical $CO_2$, as shown in FIG. 1. The density ratio is defined by the density of the low temperature supercritical $CO_2$ divided by the density of the high temperature supercritical $CO_2$ at a given pressure. For example, if the density of the low temperature supercritical $CO_2$ flowing into the injections well is 0.69 g/cm3 and the density of the high temperature supercritical $CO_2$ flowing up the production well is 0.2 g/cm3, then the density ratio is 3.45. The low temperature supercritical $CO_2$ is typically the temperature maintained in the induction well and the high temperature supercritical $CO_2$ is typically the temperature maintained in the production well.

As discussed, FIG. 1 is a graph showing pressures of supercritical $CO_2$ as a function of the density ratio of supercritical $CO_2$ at three different temperature spreads (e.g., temperature spread between induction well and production well). A first curve $T_1$ shows that a temperature difference of 75° C. from 275° C. to 350° C. produces no appreciable optimum (bottom curve), but the same temperature difference (75° C.) from 75° C. to 150° C. does produce an optimum near 2400 psia, as shown in $T_2$. Also surprising is that the optimum is in a narrow band of pressure between about 1400 and about 4000 psia. The optimum pressure shifts only slightly when the temperature spread is 275° C. from 75° C. to 350° C. (curve $T_3$).

While FIG. 1 illustrates a curve for three different temperature spreads, the present invention may be carried out with other temperature spreads and/or temperature ranges. In some embodiments the temperature difference between the high temperature supercritical $CO_2$ and the low temperature supercritical $CO_2$ is at least 50° C., 75° C., 100° C., 150° C., or 200° C. and/or less than 500° C., 400° C., 350° C., 200° C., 150° C. or with a range thereof. The higher density, lower temperature supercritical $CO_2$ (typically in the injection well) may be maintained at a temperature of at least 50° C., 75° C., or 100° C. and/or less than 200° C., 150° C., or 100° C., and/or in a range of the foregoing upper and lower temperatures. The lower density, high temperature supercritical $CO_2$ may be less than 600° C., 500° C., 400° C., 300° C., and/or greater than 150° C., 200° C., 250° C. and/or within a range of the foregoing upper and lower endpoints. These temperatures are maintained for supercritical $CO_2$ at a pressure of at least 1400 psia, 1600 psia, or 1800 psia and/or less than 4000 psia, 3800 psia, 3400 psia, or 3200 psia, and/or within a range of any of the foregoing pressures. The foregoing pressure range may be maintained in the closed loop fluid path. The foregoing temperatures and pressure ranges create a thermosiphoning effect with maximum flow of supercritical $CO_2$ within the system.

To achieve the desired temperatures and pressures, the flow of supercritical $CO_2$ is controlled (e.g., using valve 220a and 220b, FIG. 2). The flow rate at the production well 206 may be selected to control the residence time of the supercritical $CO_2$ in the hot rock reservoir. The residence time of the supercritical $CO_2$ in combination with the temperature of the hot rock determines the peak or high temperature reached by the supercritical $CO_2$. The longer the supercritical $CO_2$ remains in the hot rock reservoir, within limits, the more heat that can be exchanged and the higher the temperature that can be reached.

The heated supercritical $CO_2$ flows through the valve and into an energy producing system where a portion of the heat is extracted. The amount of heat extracted from the supercritical $CO_2$ in the energy producing system alone or in combination with a reduction in pressure determines the temperature and pressure (and thus density) of the supercritical $CO_2$ as it enters the induction well. Where a heat exchanger and secondary working fluid are used (e.g., FIG. 2), the flow rate of the secondary working fluid may be increased or decreased to increase or decease the rate at which heat is removed from the supercritical $CO_2$. Similarly, where the supercritical $CO_2$ is used in a direct turbine, the load on the turbine may be selected to increase or decrease the pressure and/or temperature in the above ground portion of the system.

In some embodiments, the temperatures and pressures are selected to maintain a desired density ratio (i.e., density of the low temperature supercritical $CO_2$ divided by the density of the high temperature supercritical $CO_2$). In some embodiments the temperature and pressure are selected from the ranges described herein to achieve a density ratio of at least 1.5, 2.0, 2.5, 3.0, or 3.5. The higher the density ratio maintained in the geothermal system the greater the siphoning effect. The increased force from improved thermosiphoning will create a faster flow rate as compared to a less optimal system and can be implemented to minimize or eliminate pumping and/or to increase the flow rate and extract heat more rapidly. The hotter the rock in the reservoir, the more advantageous the increased flow is for extracting heat more rapidly. Alternatively, the increased fluid force from improved thermosiphoning may be advantageous, to allow for a decrease in pressure from expansion of the supercritical CO2 in a turbine, without causing a phase change in the fluid.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. Detailed descriptions of apparatus and processing techniques known in the field of the invention to one of ordinary skill in the art have been excluded for convenience and clarity to the reader.

What is claimed is:

1. A method for thermosiphoning a working fluid within a geothermal formation comprising:
   providing a geothermal energy system comprising an injection well, an underground hot reservoir, and a production well, wherein the injection well, the reservoir and the production well provide a fluid path;
   heating supercritical $CO_2$ and circulating the supercritical $CO_2$ within the fluid path of the geothermal energy system; and
   siphoning the supercritical $CO_2$ in the fluid path by,
      maintaining a low temperature of the supercritical $CO_2$ within the injection well in a range between 50° C. to 200° C.;
      maintaining a high temperature of the supercritical $CO_2$ within the production well in a range between 150° C. to 350° C., where the high temperature of the supercritical $CO_2$ is at least 50° C. greater than the low temperature of the supercritical $CO_2$; and
      maintaining a pressure of the supercritical $CO_2$ in the fluid path in a range from 1400 psia to 4000 psia; and
      maintaining a supercritical $CO_2$ density ratio of at least 1.5, where the density ratio is the ratio of the density of the $CO_2$ at the low temperature divided by the density of the $CO_2$ at the high temperature, and wherein the density ratio has a peak within the range of the pressure of the supercritical $CO_2$.

2. The method of claim 1, wherein the siphoning in the fluid path is produced in part by maintaining the pressure of the supercritical $CO_2$ in the fluid path in a range from 1600 psia to 3400 psia.

3. The method of claim 1, wherein the supercritical $CO_2$ density ratio is above 2.0.

4. The method of claim 1, wherein the low temperature of the supercritical $CO_2$ within the injection well is maintained in a range from 60° C. to 120° C.

5. The method of claim 1, wherein the low temperature of the supercritical $CO_2$ within the injection well is maintained in a range from 70° C. to 90° C.

6. The method of claim 1, wherein the high temperature of the supercritical $CO_2$ within the production well is maintained in a range from 200° C. to 350° C.

7. The method of claim 1, wherein the high temperature of the supercritical $CO_2$ within the production well of the geothermal energy system is maintained in a range from 250° C. to 350° C.

8. The method of claim 1, wherein the siphoning produces sufficient work to provide the circulation without additional pumping.

9. The method of claim 1, wherein the heated supercritical $CO_2$ is used to heat a binary Rankine cycle working fluid, which provides heat to a turbine.

10. The method of claim 1, wherein the geothermal energy system includes a heat exchanger that extracts heat from the supercritical $CO_2$ to drive a turbine or perform work.

11. The method of claim 10, further comprising generating electricity using the turbine or work and delivering the electricity to an electrical grid.

12. The method of claim 1, wherein the geothermal energy system includes a power generating turbine that is driven directly by the supercritical $CO_2$.

13. The method of claim 1, wherein the heated supercritical $CO_2$ expands directly into a power generating turbine and is then reintroduced into the fluid path.

14. The method of claim 1, wherein the heated supercritical $CO_2$ is used in a direct heat application selected from the group consisting of space heating, preheating materials for a chemical process, drying a wet mineral, heating a greenhouse, drying a crop, and heating water.

15. The method of claim 1, wherein the hot reservoir is a fractured hot rock.

16. The method of claim 15, wherein the fractured hot rock is surrounded by unfractured hot rock having a permeability of less than 0.001 millidarcy.

17. The method of claim 15, wherein the fractured hot rock is a granite formation.

18. The method of claim 1, wherein the hot reservoir is at a depth in a range of from 1,000 feet to 30,000 feet underground.

19. The method of claim 1, wherein the siphoning is carried out for a period of at least 48 hours.

20. The method of claim 1, wherein the hot reservoir has a temperature in a range from 150° C. to 1,000° C.

21. The method of claim 1, wherein the hot reservoir has a temperature in a range from 150° C. to 600° C.

22. A system comprising the injection well, the production well, the underground hot reservoir, and the supercritical $CO_2$ of the method of claim 1 and configured to perform the method of claim 1.

* * * * *